United States Patent [19]

Johnson, Jr.

[11] Patent Number: 5,618,415
[45] Date of Patent: Apr. 8, 1997

[54] METHOD FOR REMOVING DEBRIS FROM A FREE FLOWING WATER SYSTEM

[75] Inventor: Ronald L. Johnson, Jr., Midland, Mich.

[73] Assignee: Johnson Technology Management, LLC, Midland, Mich.

[21] Appl. No.: 618,202

[22] Filed: Mar. 19, 1996

Related U.S. Application Data

[62] Division of Ser. No. 237,821, May 4, 1994, Pat. No. 5,573,659.

[51] Int. Cl.$^6$ .................... B01D 33/04; B01D 33/056; B01D 37/00
[52] U.S. Cl. .................... 210/158; 210/160; 210/400; 210/393; 210/779; 210/780; 210/783; 210/739; 210/744
[58] Field of Search .................... 210/158, 160, 210/400, 393, 779, 780, 783, 739, 744

[56] References Cited

U.S. PATENT DOCUMENTS

| | | |
|---|---|---|
| 1,897,904 | 2/1933 | Hurxthal . |
| 2,102,570 | 12/1937 | Lind . |
| 2,162,325 | 6/1939 | Briles . |
| 2,307,601 | 1/1943 | Nichols . |
| 2,525,516 | 10/1950 | Bergmann . |
| 2,684,157 | 7/1954 | Tolman . |
| 3,485,342 | 12/1969 | Fechter . |
| 3,850,804 | 11/1974 | Taylor . |
| 3,856,678 | 12/1974 | Hagihara . |
| 3,872,006 | 3/1975 | Abel . |
| 3,975,275 | 8/1976 | Kato . |
| 4,138,340 | 2/1979 | Suzuki . |
| 4,186,091 | 1/1980 | Sutton . |
| 4,188,294 | 2/1980 | Higihara . |
| 4,323,451 | 4/1982 | Hagihara . |
| 4,360,426 | 11/1982 | Wetzel . |
| 4,597,864 | 7/1986 | Wiesemann . |
| 4,692,242 | 9/1987 | Jackson . |
| 4,709,804 | 12/1987 | Duperov . |
| 4,812,231 | 3/1989 | Wiesemann . |
| 5,059,313 | 10/1991 | Etschel et al. . |
| 5,102,536 | 4/1992 | Wiesemann . |
| 5,171,436 | 12/1992 | Botsch . |
| 5,387,336 | 2/1995 | Bormet . |
| 5,387,337 | 2/1995 | Byers . |
| 5,565,093 | 10/1996 | Frankenberger . |

FOREIGN PATENT DOCUMENTS

| | | |
|---|---|---|
| 208879 | 4/1908 | Germany . |
| 4016450 | 11/1991 | Germany . |
| 3-257212 | 11/1991 | Japan . |
| 3-260210 | 11/1991 | Japan . |
| 263693 | 1/1927 | United Kingdom . |
| 319068 | 9/1929 | United Kingdom . |

*Primary Examiner*—Thomas M. Lithgow
*Attorney, Agent, or Firm*—Ian C. McLeod; Mary M. Moyne

[57] ABSTRACT

A method for removing debris from a free flowing water system (100) using an improved filter apparatus (10) is described. The apparatus includes a rail (12) which is mounted adjacent the water supply intake opening (102) and a continuous belt (36) made of chain links (38) and connectors (44) which mounts around an upper sprocket cylinder (26) and a lower sprocket cylinder (32) spaced between the ends of the rail. Openings (42) in the belt collect debris from the water flowing through the belt. The connectors have lifters (50) which move the debris collected on the front side (36A) of the belt and tilt to dump any debris of excess weight back into the water system. As the belt moves upward, the debris collected on the belt and by the lifters is moved out of the water system toward the top of the rail. As the belt moves over the upper sprocket cylinder, the upper sprocket teeth (28A) extend through the openings of the belt loosening the debris trapped on the front side of the belt. As the connectors move over the first sprocket cylinder, the lifters are turned upside down which dumps the debris into a collection trough (104). A water pressure jet (60) sprays the remaining debris from the belt as the belt moves downward back into the water system.

14 Claims, 10 Drawing Sheets

METHOD FOR REMOVING DEBRIS FROM A FREE FLOWING WATER SYSTEM

This is a divisional of application Ser. No. 08/237,821 filed on May 4, 1994 now (U.S. Pat. No. 5,536,659).

BACKGROUND OF THE INVENTION

(1) Field of the Invention

The present invention relates to an improved filter apparatus for removing debris from a free flowing water system. In particular, the present invention relates to a filter apparatus which has a continuous belt comprised of chain links forming openings in the belt. The front side of the belt collects debris as the water system flows through the openings of the belt. The belt moves along a path formed by a rail extending between an upper and lower sprocket cylinder. As the belt moves over the upper sprocket cylinder at the top of the apparatus, the sprocket teeth on the upper sprocket cylinder extend into the openings of the belt and loosen the debris collected on the belt which then drops into a trough. The belt also has lifters which enable the belt to move the collected debris upward. The lifters dump the collected debris into the trough as the lifters rotate over the top of the rail.

(2) Prior Art

The prior art has shown various types of filters or debris collecting apparatus which use a continuous conveyor-like belt to move the debris upward out of the water. Illustrative are U.S. Pat. Nos. 3,856,678 to Hagihara and 5,059,313 to Etschel.

Hagihara describes a filter medium for filtration of solids from a liquid flowing through a channel. The filter medium is in the form of an endless belt which extends over first, second and third shafts which rotate to move the belt through and up out of the water. The belt is comprised of filter units each having a shank portion and a hook portion which collect the debris as the filter units are moved through the water. As the filter units move over the third shaft, the hook portions of the filter units are caused to swing outward thereby casting off the collected debris. The filter medium does not adequately collect the debris and the filter units are not completely cleaned when the filter moves over the third shaft and dumps the debris.

Etschel et al describes a separating apparatus for sewage clarification plants. The apparatus consists of a plurality of rake sieve which are connected together and extend around an upper and lower reversing means similar to a conveyor belt. The rake sieve are made of alternately interconnected plates and spacer elements. The reversing means have sprocket teeth which engage the driver studs which extend outward from the underside of the spacer elements. The plates have a substantially hook-shaped form with a front edge directed outwardly from the plane of the rake sieve. The plates collect the solids from the water and transport the solids upwardly on the front side of the apparatus. A clearing comb meshes with the rake sieve and the plates of each rake sieve section and cleans the solid particles pressed into the rake sieve. The apparatus does not completely clean the rake sieve and thus allows build up of debris and other growth on the rake sieve.

Also of interest are U.S. Pat. Nos. 1,897,904 to Hurxthal; 2,307,601 to Nichols; 3,485,342 to Fechter; 3,872,006 to Abel and 3,975,275 to Kato which show different types of apparatus for removing debris from a free flowing water system. There remains a need however for an apparatus which removes debris from a free flowing water system and which completely cleans the openings in the belt to remove all the debris and to prevent the build up of flow restricting deposits in the openings.

OBJECTS

Therefore, it is an object of the present invention to provide an improved filter apparatus which will remove debris from the water system. Further, it is an object of the present invention to provide an apparatus which filters the debris from the free flowing water system along the entire length of the belt. Still further, it is an object of the present invention to provide an apparatus which removes all the particles and build up of deposits in the openings of the belt each time the belt passes over the top of the apparatus. Furthermore, it is an object of the present invention to provide an apparatus in which the lifters are able to tilt to dump debris of excess weight back into the water system. Finally, it is an object of the present invention to provide an apparatus which is easily mounted for use with an existing water intake opening or alternately mounted adjacent a new structure having a water intake opening.

DESCRIPTION OF THE PREFERRED EMBODIMENTS

The present invention relates to an apparatus for removing debris from a free flowing water system, which comprises: a rail means having vertically oriented members defining an inclined path between the members, the rail means having a top and a bottom with the bottom extendable downward into the water system; a continuous belt means having a plurality of chain links pivotably connected together to form the belt means and having a plurality of openings extending horizontally across the belt means, wherein the belt means extends between and around the top and the bottom of the rail means and is moveable upward along the path; a first sprocket cylinder means mounted at the top of the rail means having a first longitudinal axis and with a plurality of first sprocket teeth which extend into the openings of the belt means across the belt means during movement of the belt means around the top of the rail means to clean the openings of the belt means; a second sprocket cylinder means mounted at the bottom of the rail means having a second longitudinal axis parallel to the first longitudinal axis and with a plurality of second sprocket teeth which engage the links of the belt means to move the belt means around the bottom of the rail means; a plurality of debris engaging means tiltably mounted on the belt means, wherein the debris engaging means tilt by moving the belt means away from the path in response to debris of excessive weight which dumps the debris back into the water system; and motor means mounted adjacent the top of the rail means and connected to the first sprocket cylinder means for moving the belt means around the rail means.

Further, the present invention relates to an apparatus for removing debris from a free flowing water system, which comprises: a rail means having spaced apart vertically oriented first members defining an inclined path between the first members and second members between the first members, the rail means having a top and a bottom with the bottom extendable downward into the water system; a continuous belt means having a plurality of chain links horizontally and vertically interconnected to form the belt means and having a plurality of openings extending horizontally across the belt means, wherein the belt means extends between and around the top and the bottom of the rail means and is moveable upward along the path; a first sprocket cylinder means mounted at the top of the rail means having a first longitudinal axis and with a plurality of sprocket teeth which extend into the openings of the belt means across the belt means during movement of the belt means around the top of the rail means to clean the openings of the belt means; a second sprocket cylinder means mounted at the bottom of the rail means having a second longitudinal axis parallel to the first longitudinal axis and with a plurality of Y-shaped sprocket teeth which engage the links of the belt means to move the belt means around the bottom of the rail means; a plurality of rake means tiltably mounted on the belt means wherein the rake means tilt by moving the chain links away from the path in response to debris of excessive weight which dumps the debris back into the water system; motor means mounted adjacent the top of the rail means and connected to the first sprocket cylinder means for moving the belt means around the rail means on the first sprocket cylinder means; pressure jet means mounted at the top of the rail means adjacent the belt means for cleaning the openings of the belt means after the openings of the belt means have moved past the first sprocket cylinder means; a barrier plate mounted on the rail means beneath the belt means where the belt means travels upwards above an upper level of the water system for preventing debris from falling through the openings in the belt means and into the water system; and a flange means mounted adjacent the bottom of the rail means in the water system for preventing debris from passing under the apparatus.

Still further, the present invention relates to a method for removing debris from a free flowing water system, which comprises the steps of: providing an apparatus in the water system to remove the debris, the apparatus which comprises: a rail means having vertically oriented members defining an inclined path between the members, the rail means having a top and a bottom with the bottom extendable downward into the water system; a continuous belt means having a plurality of chain links pivotably connected together to form the belt means and having a plurality of openings extending horizontally across the belt means, wherein the belt means extends between and around the top and the bottom of the rail means and is moveable upward along the path; a first sprocket cylinder means mounted at the top of the rail means having a first longitudinal axis and with a plurality of first sprocket teeth which extend into the openings of the belt means across the belt means during movement of the belt means around the top of the rail means to clean the openings of the belt means; a second sprocket cylinder means mounted at the bottom of the rail means having a second longitudinal axis parallel to the first longitudinal axis and with a plurality of second sprocket teeth which engage the links of the belt means to move the belt means around the bottom of the rail means; a plurality of debris engaging means tiltably mounted on the belt means, wherein the debris engaging means tilt by moving the belt means away from the path in response to debris of excessive weight which dumps the debris back into the water system; and motor means mounted adjacent the top of the rail means and connected to the first sprocket cylinder means for moving the belt means around the rail means; providing a collection means adjacent the top of the rail means of the apparatus to collect the debris removed from the water system; connecting the apparatus to a power source; and activating the motor means of the apparatus to move the belt means to remove debris from the water system, wherein the first sprocket teeth prevent accumulation of clogging deposits in the openings of the belt means.

Furthermore, the present invention relates to a method for constructing a debris removal system for a free flowing water system: providing at least one apparatus in the water system, the apparatus having a rail means with vertically oriented members defining an inclined path between the members, the rail means having a top and a bottom with the bottom extendable downward into the water system; a continuous belt means having a plurality of chain links pivotably connected together to form the belt means and having a plurality of openings extending horizontally across the belt means, wherein the belt means extends between and around the top and the bottom of the rail means and is moveable upward along the path; a first sprocket cylinder means mounted at the top of the rail means having a first longitudinal axis and with a plurality of first sprocket teeth which extend into the openings of the belt means across the belt means during movement of the belt means around the top of the rail means to clean the openings of the belt means; a second sprocket cylinder means mounted at the bottom of the rail means having a second longitudinal axis parallel to the first longitudinal axis and with a plurality of second sprocket teeth which engage the links of the belt means to move the belt means around the bottom of the rail means; a plurality of debris engaging means tiltably mounted on the belt means, wherein the debris engaging means tilt by moving the belt means away from the path in response to debris of excessive weight which dumps the debris back into the water system; and motor means mounted adjacent the top of the rail means and connected to the first sprocket cylinder means for moving the belt means around the rail means; providing a collection means adjacent the top of the rail means of the apparatus to collect the debris removed from the water system; and connecting the apparatus to a power source wherein in use the debris in the water system is collected by the debris engaging means and moved up the rail means and wherein the debris is loosened from the belt means by the first sprockets of the first sprocket cylinder means so that the debris falls into the collection means.

Still further, the present invention relates to an improvement in an apparatus for removing debris from a free flowing water system including, a first sprocket cylinder means having a first longitudinal axis, a second sprocket cylinder means spaced apart from the first sprocket cylinder means and having a second longitudinal axis parallel to the first longitudinal axis, wherein the first and second sprocket cylinder means define an inclined path, a belt means having a plurality of chain links pivotably connected together to form the belt means and having a plurality of openings extending horizontally across the belt means, wherein the belt means extends along the path in between the first and second sprocket cylinder means and motor means connected to the first sprocket cylinder means for moving the belt means between the first and second sprocket cylinder means along the path, the improvement which comprises: a plurality of first sprocket teeth mounted on the first sprocket cylinder means which extend into the openings of the belt means across the belt means during movement of the belt means around the first sprocket cylinder means to clean the openings of the belt means; a plurality of connectors having an elevated center portion pivotably mounted between vertically spaced apart chain links of the belt means; and a plurality of debris engaging means tiltably mounted on the center portion of the connectors, wherein the debris engaging means tilt by moving the belt means away from the path in response to debris of excessive weight which dumps the debris back into the water system.

Finally, the present invention relates to a system for removing debris from a free flowing water system, which comprises: an apparatus having a rail means with vertically oriented members defining an inclined path between the members, the rail means having a top and a bottom with the bottom extendable downward into the water system; a continuous belt means having a plurality of chain links pivotably connected together to form the belt means and having a plurality of openings extending horizontally across the belt means, wherein the belt means extends between and around the top and the bottom of the rail means and is moveable upward along the path; a first sprocket cylinder means mounted at the top of the rail means having a first longitudinal axis and with a plurality of first sprocket teeth which extend into the openings of the belt means across the belt means during movement of the belt means around the top of the rail means to clean the opening of the belt means; a second sprocket cylinder means mounted at the bottom of the rail means having a second longitudinal axis parallel to the first longitudinal axis and with a plurality of second sprocket teeth which engage the links of the belt means to move the belt means around the bottom of the rail means; a plurality of debris engaging means tiltably mounted on the belt means, wherein the debris engaging means tilt by moving the belt means away from the path in response to debris of excessive weight which dumps the debris back into the water system; and motor means mounted adjacent the top of the rail means and connected to the first sprocket cylinder means for moving the belt means around the rail means; a support means for mounting the apparatus at an inclined angle in the water system adjacent a water supply intake opening; and a collection means mounted adjacent the top of the rail means of the apparatus to collect the debris removed from the water system.

The apparatus is provided with connectors having an elevated center portion which are connected between adjacent chain links on the belt means. The rake means which are preferably L-shaped lifters are mounted on the center portion of the connectors. The lifter and the connectors extend horizontally across the belt and can be constructed as a unitary piece. The elevated center portion of the connectors has a height which allows the sprockets of the first sprocket cylinder to extend into the elevated center portion as the belt means moves around the top of the rail means. The lifter can be of varying length and is adjustable along the length of the connector. The apparatus is mounted in the water system with the bottom of the rail means adjacent a ground surface and the rail means extending upward from the water system at an inclined angle. A collection means is mounted adjacent the top of the rail means of the apparatus to collect the debris removed from the water system.

Figure 1:
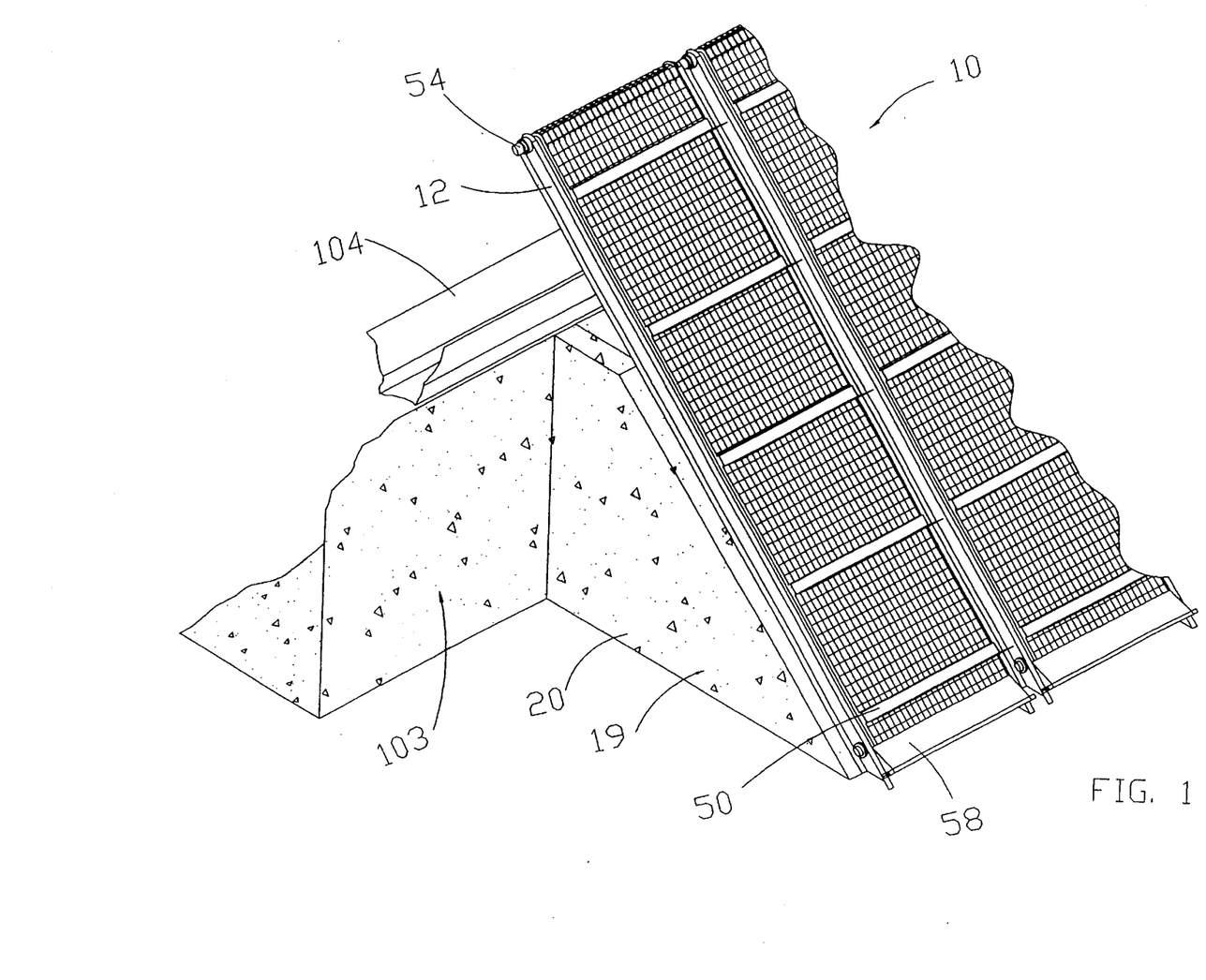
FIG. 1 is a front perspective view of the improved filter apparatus 10, showing the wall 20 forming the end block 19, the collection trough 104 and the motor 54.
Figure 3:
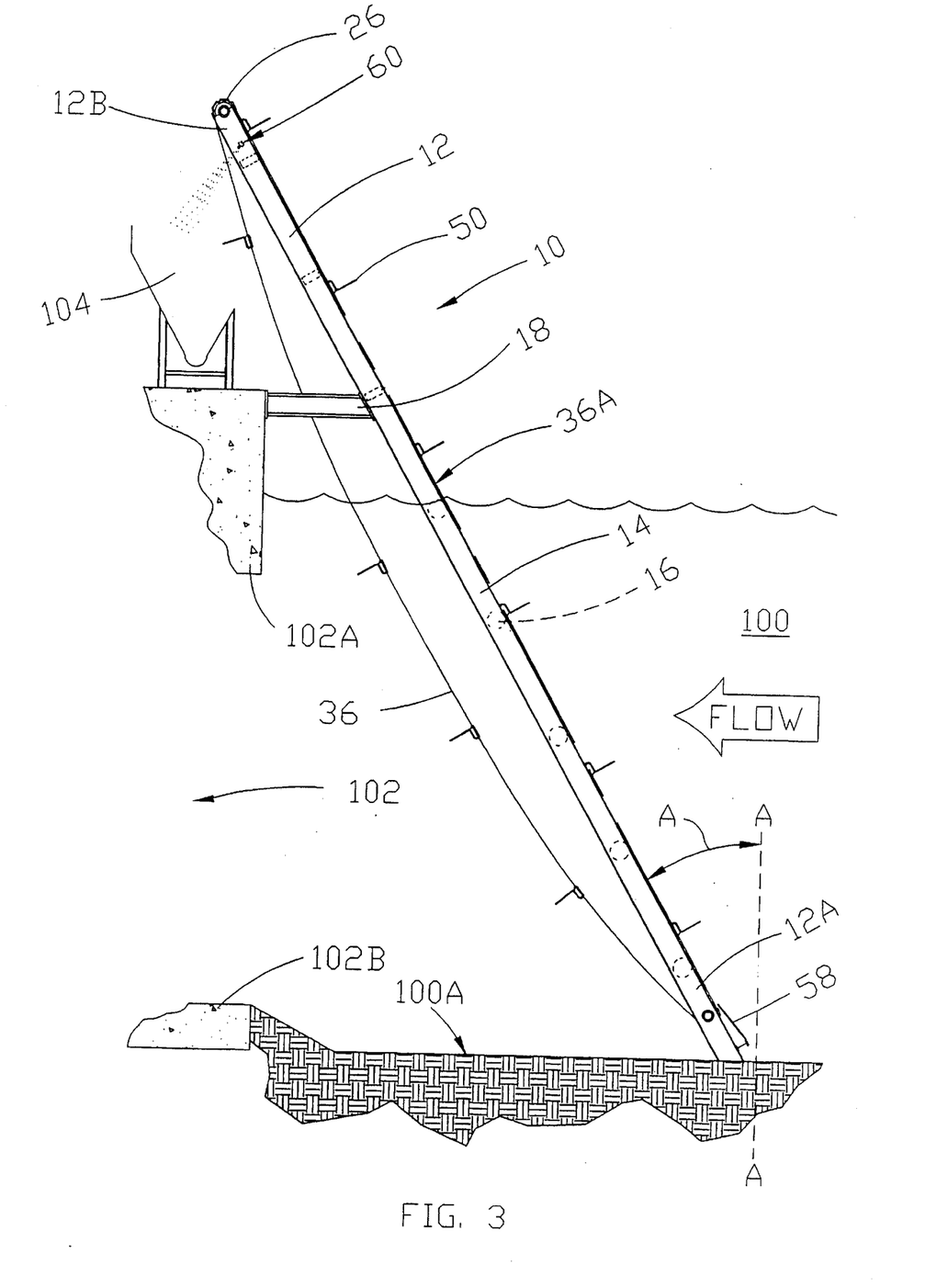
FIG. 3 is a left side view of the apparatus 10, without the end blocks 19 mounted in the water system 100, showing the support bars 18, the rail 12, the belt 36, the pressurized water jet 60, the collection trough 104 and the top and bottom platform 102A and 102B of the water supply intake opening 102.

FIG. 1 shows the preferred embodiment of the improved filter apparatus 10 of the present invention. The apparatus 10 is preferably mounted in a free flowing water system 100 adjacent to and upstream from a water supply intake opening 102 preferably of a conventional or nuclear electric generating plant (not shown) (FIG. 3). The water supply intake opening 102 is preferably used to supply cooling water to a power plant (not shown). The intake opening 102 preferably has spaced apart top and bottom platforms 102A and 102B which are spaced respectively above and below the intake opening 102 and which are part of the overall support structure 103 surrounding the intake opening 102. The bottom platform 102B is preferably adjacent the floor 100A of the water system 100 and the top platform 102A is preferably above the water system 100 adjacent to the ground surface (not shown). The apparatus 10 extends from the floor 100A of the water system 100 adjacent the bottom platform 102B of the intake opening 102 upward out of the water system 100 and beyond the top platform 102A of the intake opening 102. The apparatus 10 includes a belt 36 which moves over and around upper and lower sprocket cylinders 26 and 32 which are mounted at the top and bottom 12B and 12A, respectively of a rail 12.

The rail 12 has a ladder-like structure with vertical side bars 14 having horizontal crossbars 16 extending perpendicularly therebetween (FIG. 3). The side bars 14 of the rail 12 form a path along which the belt 36 moves. The crossbars 16 preferably have a circular cross-section and are able to rotate which allows the belt 36 to move smoothly over the crossbars 16 along the path (to be described in detail hereinafter). The crossbars 16 also support the belt 36 when the belt 36 is loaded with collected debris (not shown). The rail 12 is positioned such that the bottom 12A of the rail 12 is in the water system 100 adjacent the floor 100A of the water system 100 and the top 12B of the rail 12 extends upward out of the water system 100 beyond the top platform 102A. Preferably, the bottom 12A of the rail 12 rests on the floor 102A of the water system 100 with only the support bars 18 (to be described in detail hereinafter) holding the apparatus 10 in place. Alternately, to further secure the apparatus 10 in the water system 100, the bottom 12A of the rail 12 of the apparatus 10 is anchored to the floor 100A of the water system 100. The apparatus 10 is preferably inclined at a 20° to 30° angle (A) to the vertical axis A—A parallel to the vertical axis (not shown) of the intake opening 102 such that the top 12B of the rail 12 is closer to the top platform 102A of the opening 102 than the bottom 12A of the rail 12 is to the bottom platform 102B (FIG. 3).

Horizontal support bars 18 (one shown) keep the top 12B of the rail 12 of the apparatus 10 spaced apart from the top platform 102A of the intake opening 102 (FIG. 3). The support bars 18 extend between the top platform 102A and the side bars 14 of the rail 12 above the water system 100. Preferably, there are two (2) support bars 18 for each apparatus 10 with one support bar 18 secured to each of the vertical side bars 14 of the rail 12. The support bars 18 support the apparatus 10 at a distance from the top platform 102A of the intake opening 102. Preferably, the support bars 18 are secured at one end to the apparatus 10 and at the other end to the top platform 102A in order to hold the apparatus 10 in place and to prevent the flow of the water system 100 from moving the apparatus 10. The length of the support bars 18 is dependent on the angle of incline of the apparatus 10 with respect to the axis A—A and the positioning of the support bars 18 along the length of the apparatus 10. Preferably, the rail 12 and the support bars 18 are constructed from stainless steel although other materials such as plastic may also be used.

Figure 2:
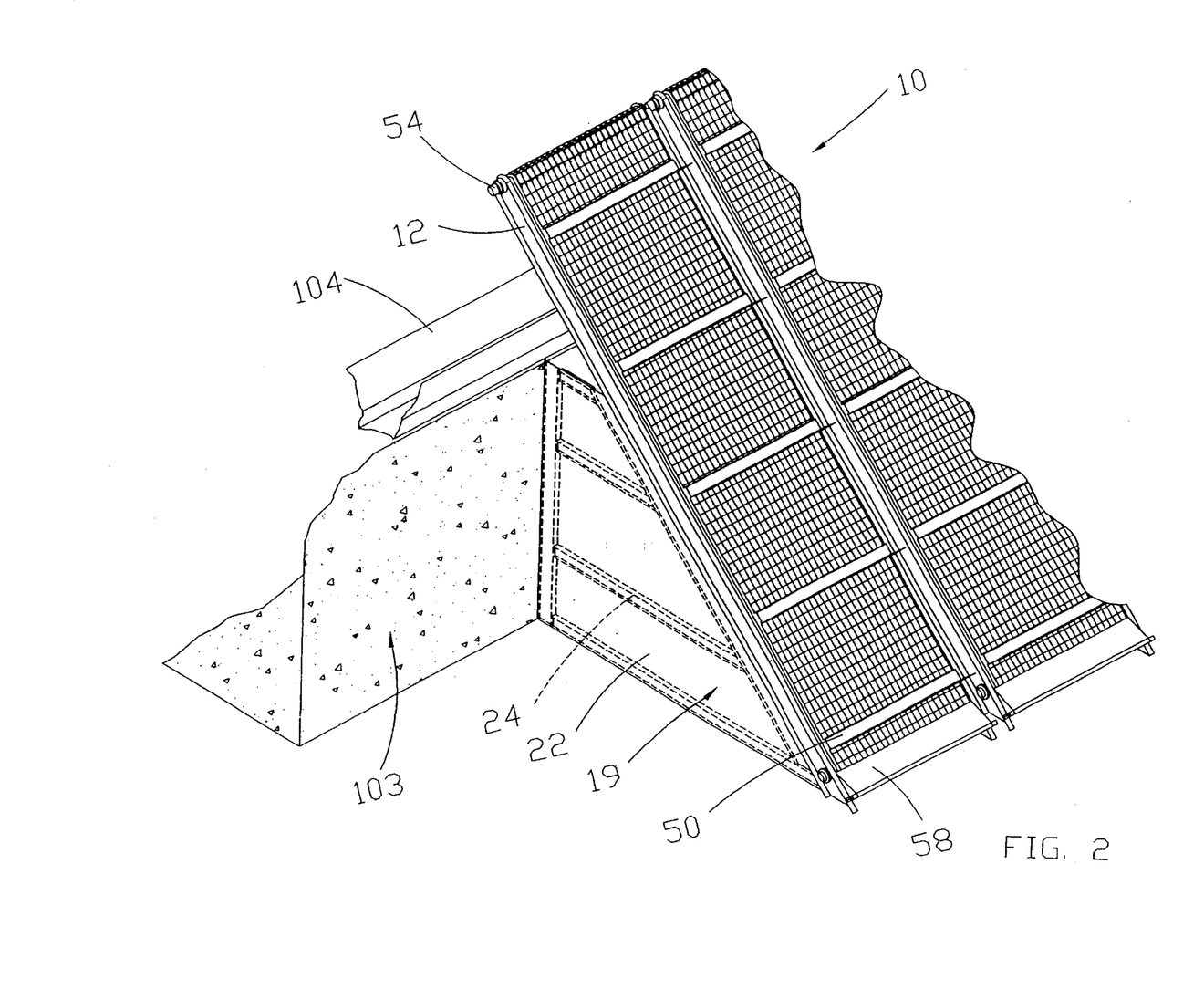
FIG. 2 is a front perspective view of the alternate embodiment showing the apparatus 10 and the plate 22 and frame 24 forming the end block 19.

A pair of end blocks 19 (one shown) are mounted on either side of the rail 12 and extend perpendicular to the apparatus 10 between the apparatus 10 and the support structure 103 of the intake opening 102 (FIGS. 1 and 2). The end blocks 19 extend from the floor 100A of the water system 100 upward to at least the top of the water system 100. Preferably, the end blocks 19 extend upwards such as to cover the support bars 18. The end blocks 19 prevent the water system 100 from moving around the sides of the apparatus 10 and entering the intake opening 102. In the preferred embodiment as shown in FIG. 1, the end blocks 19 are walls 20 (one shown) which extend outward from the support structure 103 of the intake opening 102 and are constructed as part of the platforms 102A and 102B. Preferably, the walls 20 are formed simultaneously with the support structure 103 of the intake opening 102 and the apparatus 10 is installed adjacent the walls 20 shortly thereafter. Preferably, the apparatus 10 is mounted between two walls 20 with the vertical side bars 14 of the rails 12 of the apparatus 10 in close proximity with the walls 20. Preferably, the walls 20 are constructed of concrete. In an alternate embodiment as shown in FIG. 2, the end blocks 19 are plates 22 (one shown) secured onto support frames 24 (one shown) which are mounted onto the support structure 103 of the intake opening 102. The plates 22 and the frames 24 are preferably constructed of metal although other materials may also be used to construct the plates 22 and the frame 24. The alternate embodiment is preferably used where the apparatus 10 is installed after the construction of the support structure 103 and the water intake opening 102.

Depending on the size and number of intake openings 102 and the width of the apparatus 10, several apparatus 10 may be used to filter debris from a single water system 100 for a single intake opening 102 or multiple intake openings 102 for a single power plant. Preferably the apparatus 10 are mounted side-by-side with end blocks 19 mounted only at the opposed ends of the combined apparatus 10. In addition, front plates (not shown) are provided between the side bars 14 of the rails 12 of each adjacent apparatus 10 to prevent water and debris from escaping between the apparatus 10.

Figure 5:
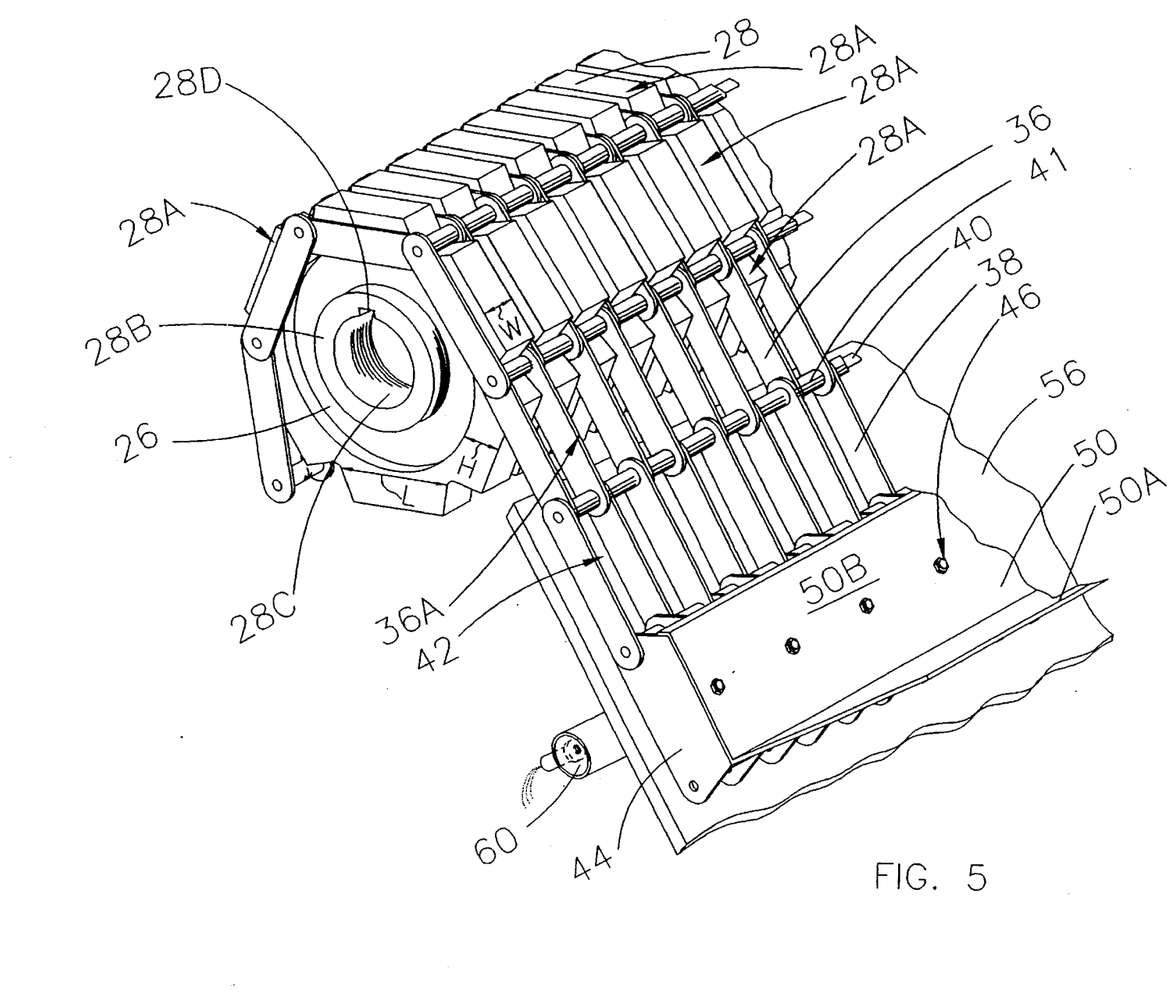
FIG. 5 is an enlarged front perspective view of the upper sprocket cylinder 26 showing the upper sprocket teeth 28A of the upper sprockets 28 extending into and through the openings 42 of the belt 36.
Figure 6:
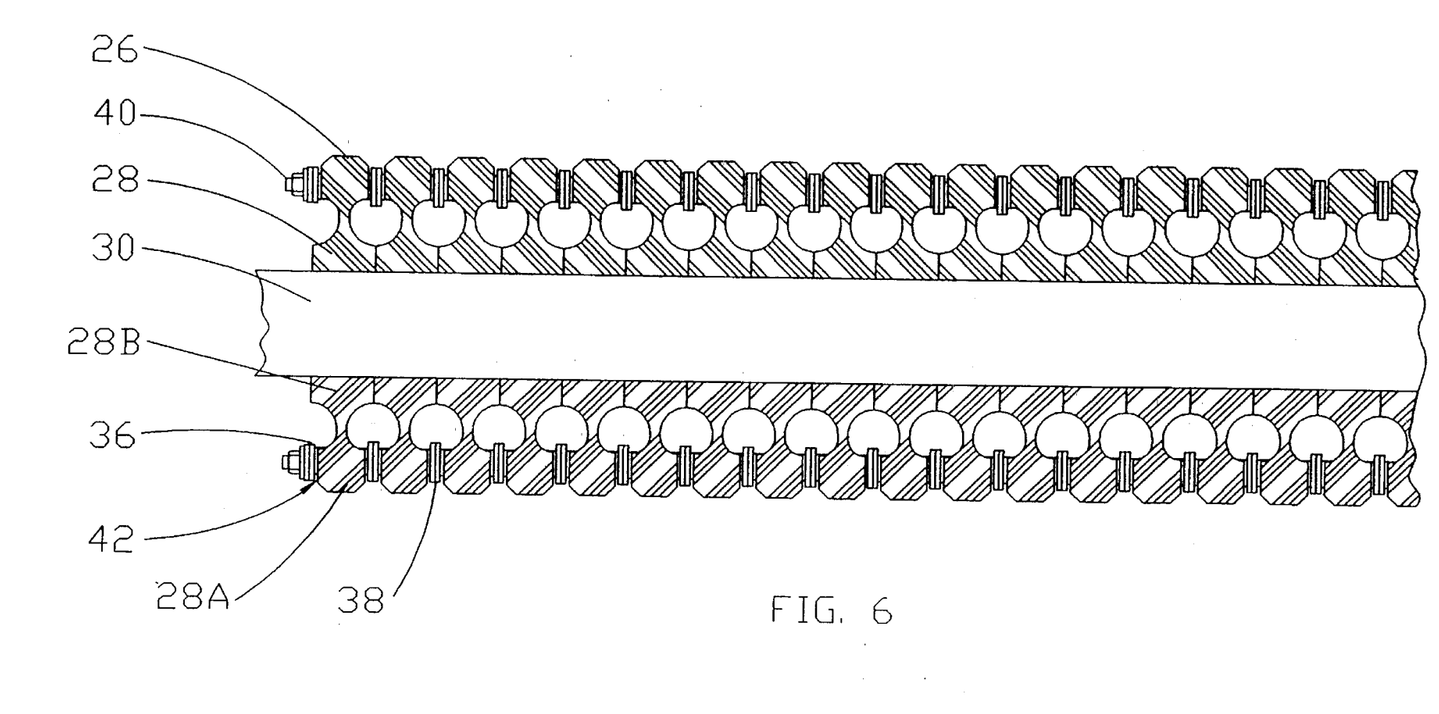
FIG. 6 is a cross-sectional view of the upper sprocket cylinder 26 showing the upper sprocket teeth 28A within the openings 42 of the belt 36.

The upper sprocket cylinder 26 is mounted at the top 12B of the rail 12 between the vertical side bars 14 parallel to the crossbars 16 of the rail 12. The upper sprocket cylinder 26 is preferably comprised of side-by-side upper sprockets 28 mounted on an upper sprocket shaft 30 (FIG. 6). The upper sprocket shaft 30 is mounted onto the side bars 14 of the rail 12 by bearings (not shown) which enable the upper sprocket cylinder 26 to rotate. The upper sprockets 28 have upper sprocket teeth 28A extending outward from around the perimeter of the upper sprockets 28 and an upper sprocket flange 28B around the center of the sprockets 28 which have an aperture 28C having a keyway 28D for mounting the upper sprockets 28 on the upper sprocket shaft 30 (FIGS. 5 and 6). The upper sprocket shaft 30 has a keyway (not shown) similar to the keyway 28D of the aperture 28C of the upper sprockets 28. The two keyways 28D mate together and allow for insertion of a key (not shown) which allows the upper sprocket cylinder 26 to rotate with the upper sprocket shaft 30. Preferably, the upper sprocket teeth 28A are rectangular in shape and of a size such as to closely fit within the openings 42 of the belt 36 so as to clean deposits from the openings 42 and to extend through the openings 42 to push the debris outward to loosen the debris collected by the belt 36 as the belt 36 moves over the top 12B of the rail 12 on the upper sprocket cylinder 26 (to be discussed in detail hereinafter). Each upper sprocket tooth 28A is preferably 6 inches (15.24 cm) (L) long slot to slot with a height of 2 inches (5.08 cm) (H) (FIG. 6). The teeth 28A are preferably shorter at the top away from the sprocket shaft 30 in order to easily fit within the openings 42 of the belt 36. Preferably, there are six (6) upper sprocket teeth 28A on each upper sprocket 28. The upper sprocket teeth 28A preferably have a width of 2.0 inches (5.08 cm) (W). In the preferred embodiment, the upper sprocket teeth 28A extend through and above the openings 42 of the belt 36 between about 0.25 to 0.5 inches (0.64 to 1.27 cm). The upper sprocket cylinder 26 preferably has an outer diameter minus the upper sprocket teeth 28A of 12 inches (30.48 cm) (FIG. 5). The diameter of the upper sprocket shaft 30 is determined by the stress to be endured by the upper sprocket cylinder 26. In addition, a center support bearing (not shown) can be added to the upper sprocket shaft 30 to further support the upper sprocket cylinder 26 if the width of the apparatus 10 becomes too large.

Figure 7:
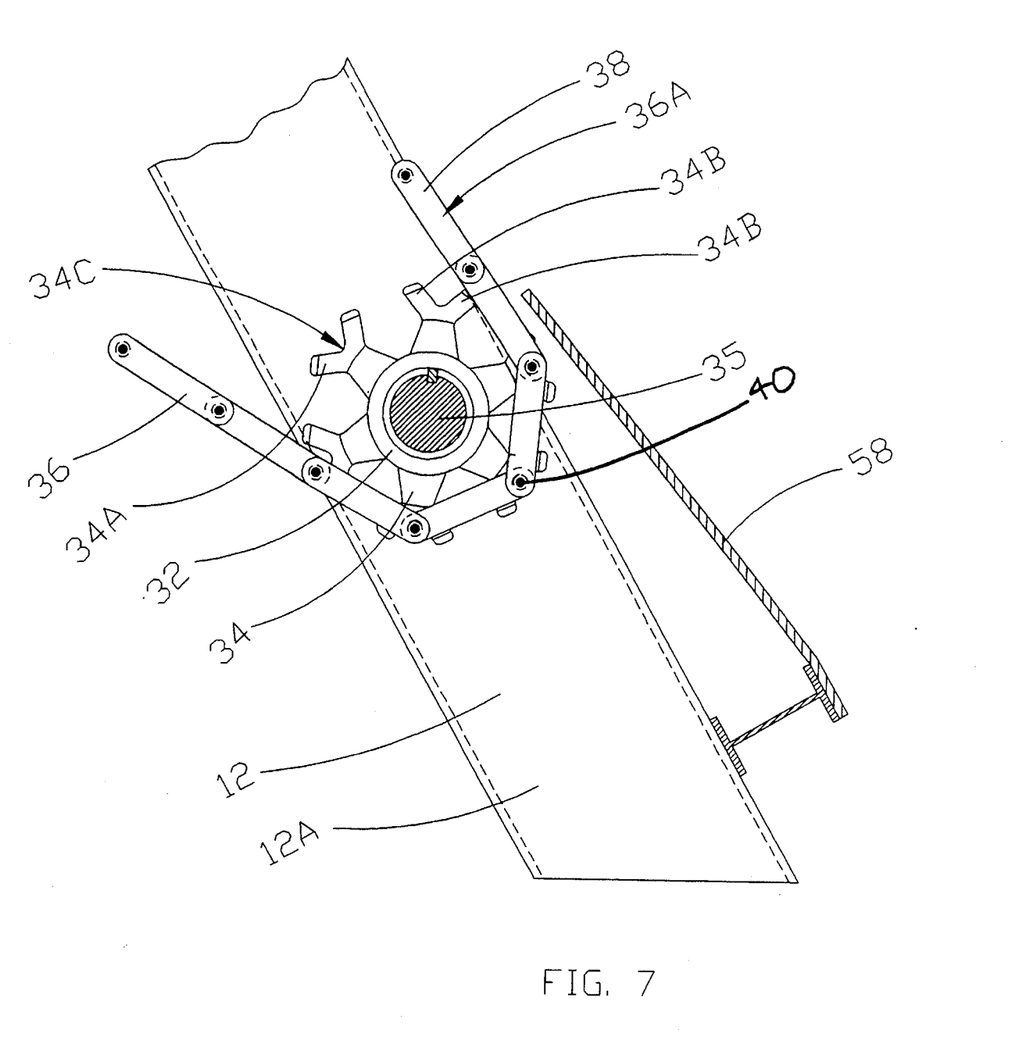
FIG. 7 is a cross-sectional side view of the lower sprocket cylinder 32 showing the Y-shaped lower sprocket teeth 34A engaging the pivot pins 40 of the chain links 38 and showing the flange 58.

The lower sprocket cylinder 32 is mounted slightly above the bottom 12A of the rail 12 between the side bars 14 parallel to the crossbars 16 of the rail 12. The lower sprocket cylinder 32 is spaced above the bottom 12A of the rail 12 in order to allow the belt 36 to move freely around the lower sprocket cylinder 32 without contacting the floor 100A of the water system 100. Preferably, the lower sprocket cylinder 32 is similar in size and construction to the upper sprocket cylinder 26 and is comprised of lower sprockets 34 having lower sprocket teeth 34A extending outward from around the perimeter of the sprockets 34. Preferably, the lower sprockets 34 are spaced apart such that the lower sprockets 34 are aligned with every other horizontal chain link 38 of the belt 36. The lower sprocket teeth 34A are shaped differently than the upper sprocket teeth 28A. The lower sprocket teeth 34A have a Y-shape with the legs 34B of the Y extending outward from the lower sprocket 34 (FIG. 7). The lower sprocket teeth 34A are spaced apart around the perimeter of the lower sprocket 34 such that as the belt 36 moves around the bottom 12A of the rail 12, the lower sprocket teeth 34A engage the bushings 41 over the pivot pins 40 of alternating chain links 38 (to be described in detail hereinafter) of the belt 36 to help move the belt 36 around the bottom 12A of the rail 12. The distance from the center of the lower sprocket shaft 35 to the V-shaped intersection 34C of legs 34B is preferably equal to the distance from the center of the upper sprocket shaft 30 to the slots between the upper sprocket teeth 28A. This allows the belt 36 to be spaced away from the rail 12 an equal distance at the top 12B and bottom 12A of the rail 12. The Y-shaped teeth 34B of the lower sprockets 34 allow for the minimum amount of material to be used to achieve the rotation of the belt 36 over the lower sprocket cylinder 32. This also helps to decrease the overall weight of the apparatus 10. There are preferably six (6) lower sprocket teeth 34A on each lower sprocket 34. Preferably, the upper and lower sprocket cylinders 26 and 32 are constructed from stainless steel.

Figure 4:
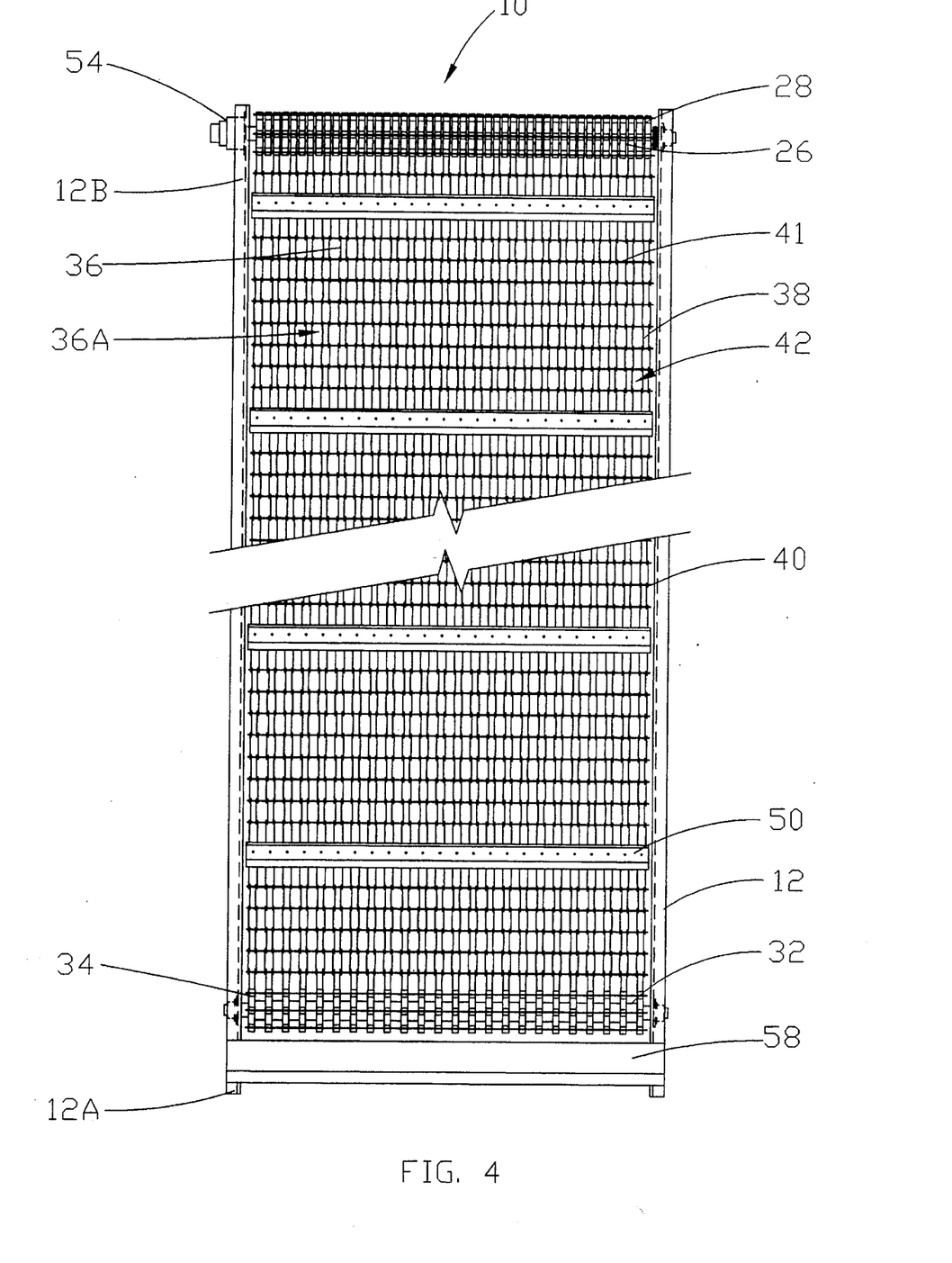
FIG. 4 is a front view of the apparatus 10 showing the belt 36 with the chain links 38, the openings 42, the lifters 50, the upper and lower sprocket cylinders 26 and 32 and the motor 54.

The belt 36 extends between the top 12B and the bottom 12A of the rail 12 around the upper and lower sprocket cylinders 26 and 32 with the front side 36A of the belt 36 on the side of the rail 12 opposite the intake opening 102 (FIG. 3). Preferably, the belt 36 has a length which allows the belt 36 to easily fit around the rail 12 and allows for slack in the belt 36. In the preferred embodiment, the sprocket cylinders 26 and 32 are spaced about 50 feet (15.24 m) apart and the belt 36 has a total length of slightly more than 100 feet (30.48 m). The extra length or slack in the belt 36 is needed to allow the lifters 50 of the belt 36 to tilt (to be described in detail hereinafter). A take-up means (not shown) is preferably located on the apparatus 10 and acts to adjust the amount of slack in the belt 36 in order to vary the weight at which the lifters 50 tilt. The preferred take up means would be to move either the upper or lower sprocket cylinder 26 or 32 away from or toward the opposed sprocket cylinder 26 or 32 which would decrease or increase, respectively the amount of slack in the belt 36. In an alternate embodiment (not shown), an idle wheel would be mounted on the rail 12 between the sprocket cylinders 26 or 32 which would move toward or away from the rail 12 to increase and decrease respectively, the amount of slack in the belt 36. The greater the amount of slack in the belt 36, the lower the weight limit at which the lifters 50 tilt and vise versa. Preferably, the particular take up used is similar to that commonly known in the art. The belt 36 is preferably about 8 to 12 feet (20.32 to 30.48 cm) across. The width of the belt 36 varies depending upon the particular use of the apparatus 10. The belt 36 is formed by chain links 38 which are horizontally and vertically interconnected by pivot pins 40 and spaced apart by bushings 41 mounted over the pivot pins 40 to form a continuous belt 36 connected end to end which extends completely around and completely across the rail 12. Preferably, a single pivot pin 40 is used to connect an entire horizontal row of chain links 38 and/or connectors 44 (to be described in detail hereinafter) together at one end to the adjacent chain links 38 and/or connectors 44 (FIG. 4). Another identical pivot pin 40 is used to similarly connect the other end of the chain links 38 and/or connectors 44 to the respective adjacent chain links 38 and/or connectors 44. Preferably, all the pivot pins 40 are similar.

Each of the individual chain links 38 forms one opening 42 of the belt 36. The openings 42 of the belt 36 allow the water system 100 to flow through the belt 36 of the apparatus 10. The chain links 38 and thus the openings 42 extend side-by-side continuously across and along the entire belt 36. Preferably, the chain links 38 are 7.5 inches (19.05 cm) in length and 2 to 2.5 inches (5.08 to 6.35 cm) in width with a height of 1.5 inches (3.81 cm) and a thickness of 0.1875 inches (0.48 cm). Preferably, the openings 42 are rectangular in shape and are approximately about 6 inches (15.24 cm) long, from the center of one pivot pin 40 to the center of the opposite pivot pin 40. The openings 42 preferably alternate in width between approximately about 2.5 inches (6.35 cm) and 2.13 inches (5.4 cm) which is the difference of two thicknesses of the two chain links 38 or 0.375 inches (0.95 cm) which is due to the method of interconnection of the chain links 38. The length of the openings 42, however, is not affected. The chain links 38 are preferably made of stainless steel although other materials such as plastic can also be used.

Figure 8:
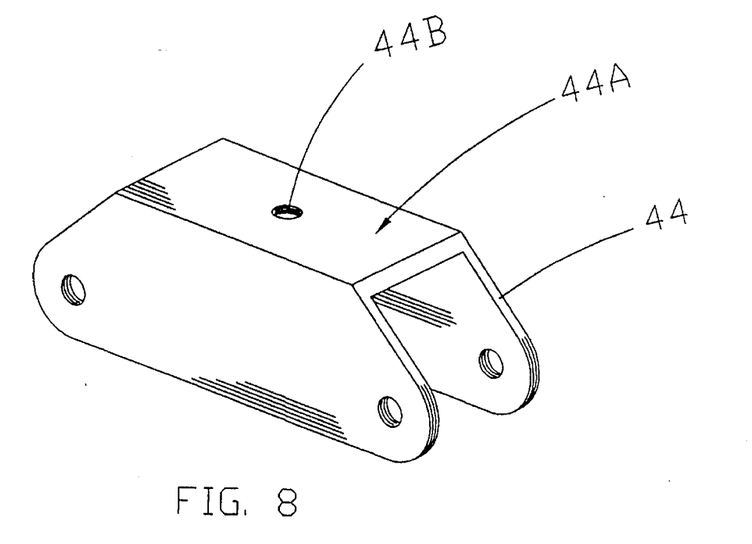
FIG. 8 is a front perspective view of a connector 44.

Horizontal rows of connectors 44 are provided on the belt 36 vertically spaced apart along the length of the belt 36. The connectors 44 are mounted between two vertically spaced chain links 38 and extend side-by-side forming a complete horizontal row across the belt 36 (FIG. 4). The connectors 44 are interconnected with the vertically adjacent chain links 38 by the pivot pins 40 to form the continuous belt 36. In the preferred embodiment, the connectors 44 are spaced such that there are 16 chain links 38 or 8 feet (20.32 cm) between each horizontal row of connectors 44. The distance between the connectors 44 varies depending on the length of the belt 36 and the amount of debris to be removed from the water system 100. The connectors 44 have an elevated center portion 44A which extends outward from the plane of the belt 36 away from the crossbars 16 of the rail 12. The center portion 44A is preferably solid and is of a height such that the upper sprocket teeth 28A of the upper sprocket cylinder 26 extend into the connectors 44 but do not contact the elevated center portion 44A and therefore do not disturb the movement of the belt 36 over the top 12B of the rail 12. The elevated center portion 44A also allows the Y-shaped lower sprocket teeth 34A of the lower sprocket cylinder 32 to engage the pivot pins 40 between the connectors 44 without contacting the center portion 44A of the connectors 44 and thus without disrupting the movement of the belt 36 around the bottom 12A of the rail 12. The length of the connectors 44 varies depending on the length of the lifter 50 (to be described in detail hereinafter) to be mounted on the connectors 44. The length of the connectors 44 is preferably a multiple of the length of the upper sprocket teeth 28A. In the preferred embodiment, the connectors 44 have a length of 6 inches (15.24 cm) and have one hole 44B to accommodate a nut and a bolt 46 for mounting the lifter 50 (FIG. 8).

Figure 8A:
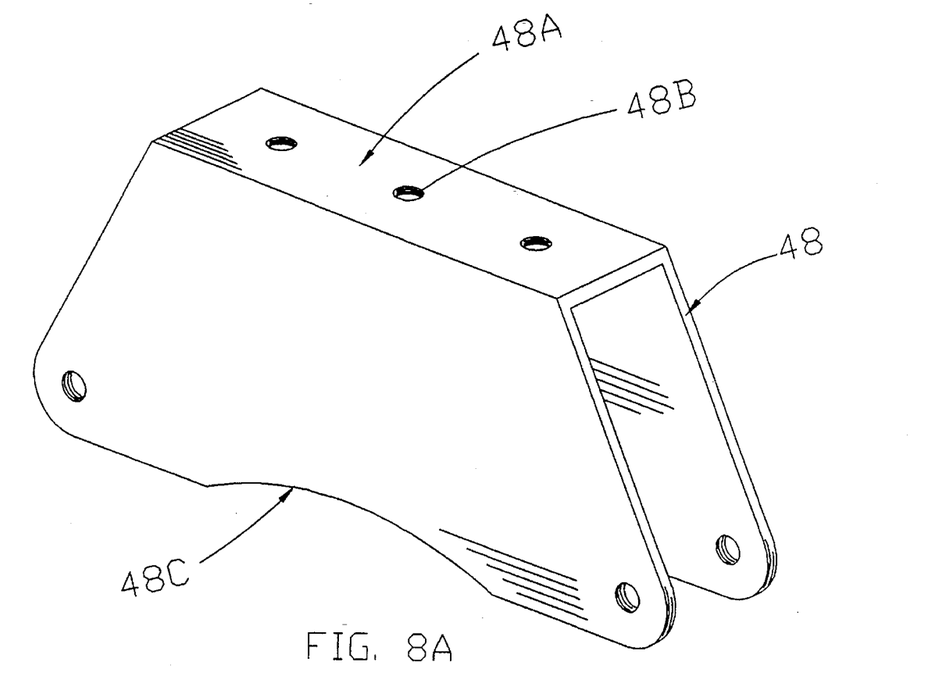
FIG. 8A is a front perspective view of an alternate extended connector 48.

In an alternate embodiment, extended connectors 48 are provided on the belt 36 (FIG. 8A). The extended connectors 48 are similar to the connectors 44 of the preferred embodiment except that the extended connectors 48 have a length of 10.5 inches (26.7 cm). In addition, the elevated center portion 48A of the extended connectors 48 have three (3) holes 48B to accommodate three (3) nuts and bolts 46 to mount the lifter 50 or alternately an extended lifter 52 (to be described in detail hereinafter) (FIG. 8A). The elevated center portion 48A of the extended connectors 48 also have a greater height than the preferred connectors 44. The added height is needed in order to enable the lifter 50 to extend over two of the sprocket teeth 28A of the upper sprockets 28 of the upper sprocket cylinder 26 simultaneously. In addition, the extended connectors 48 have an arc-shaped cut-out 48C (one shown) on either side of the extended connectors 48 between the ends of the extended connectors 48. The cut-out 48C enables the extended connectors 48 to move around the upper sprocket cylinder 26 without contacting the upper sprocket flange 28B. Extended connectors 48 are preferably used along with larger sprockets (not shown)

having at least eight (8) sprocket teeth (not shown). Furthermore, the upper sprocket teeth 28A may be rounded in order to accommodate the extended connectors 48. However, too much modification of the upper sprocket teeth 28A could potentially reduce the cleaning ability of the upper sprocket teeth 28A. The connectors 44 and 48 are preferably constructed of the same material as the chain links 38 of the belt 36.

Figures 9, 9A:
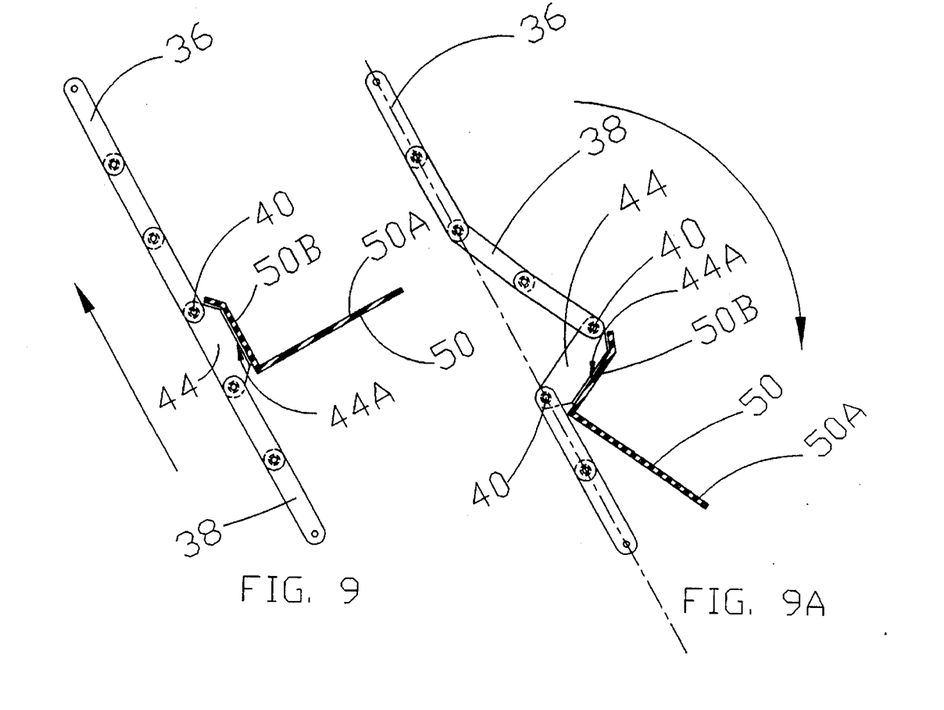
FIG. 9 is a side cross-sectional view of the lifter 50 in the untilted, standard position mounted on the connectors 44.
FIG. 9A is a side cross-sectional view of the lifter 50 in the tilted, dumping position.
Figures 10, 10A:
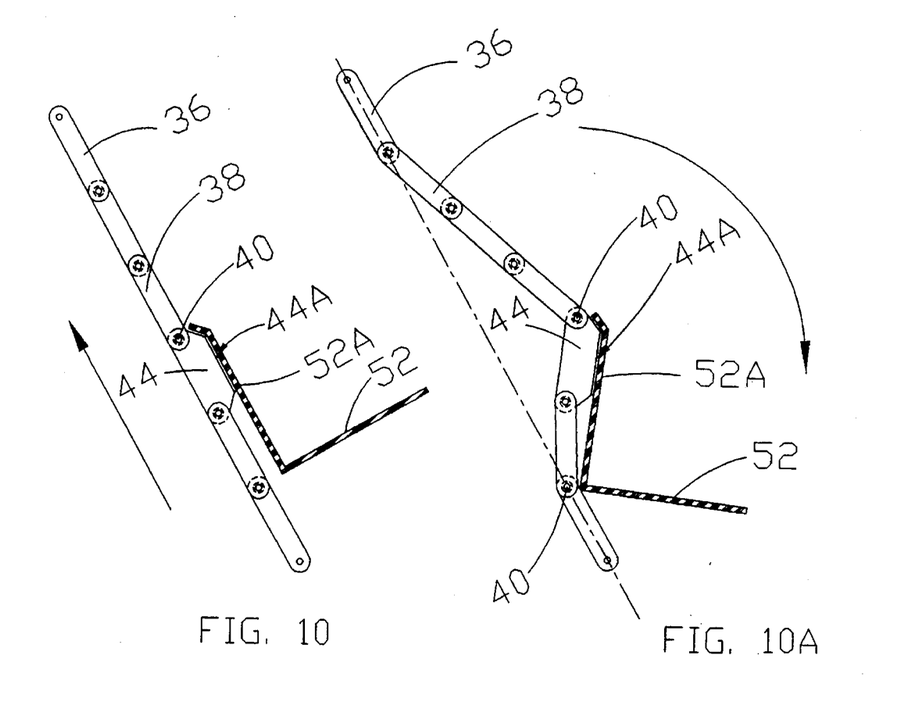
FIG. 10 is a side cross-sectional view of the alternate extended lifter 52 in the untilted, standard position mounted on the connectors 44.
FIG. 10A is a side cross-sectional view of the alternate extended lifter 52 in the tilted, dumping position.
Figure 11:
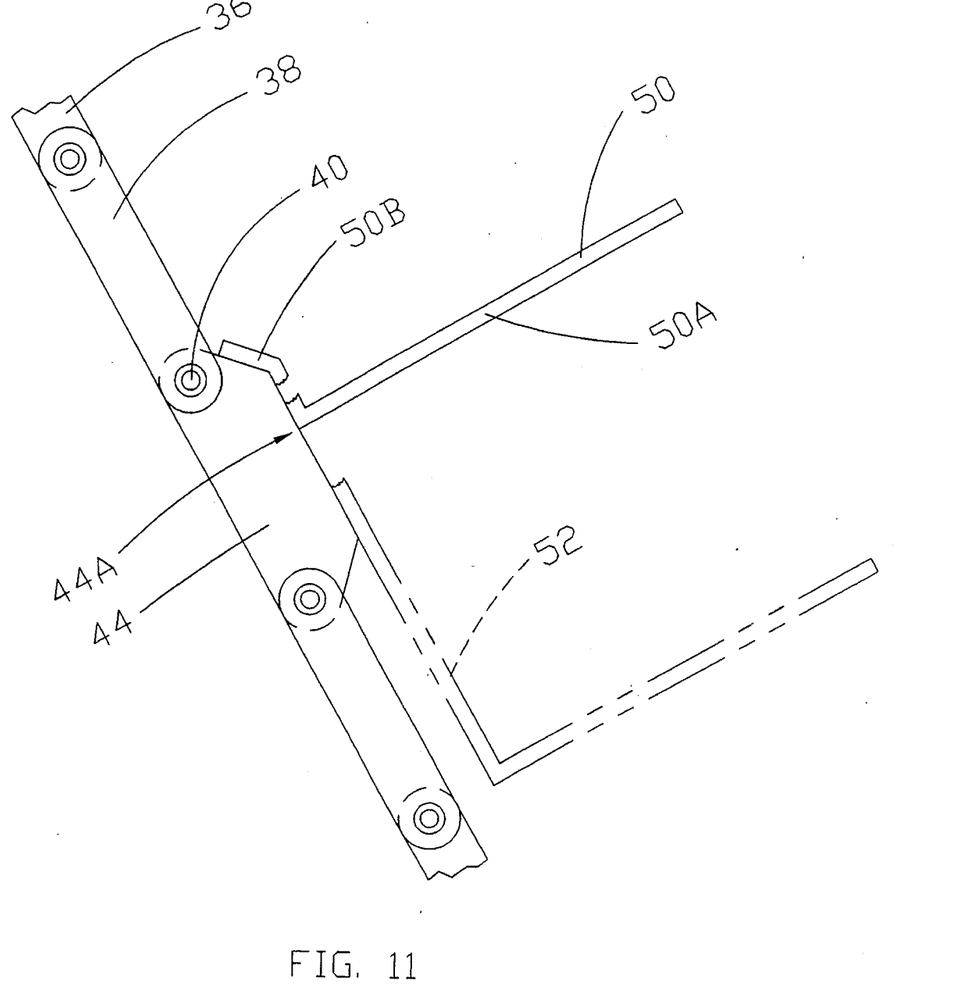
FIG. 11 is a side view of the positioning of the lifter 50 and the extended lifter 52 on the connectors 44.

In the preferred embodiment, a lifter 50 is mounted on the center portion 44A of each adjacent connector 44 comprising one horizontal row across the belt 36. The lifter 50 is L-shaped and mounted on the connectors 44 such that the outward extending leg 50A of the lifter 50 extends outward perpendicular to the plane of the belt 36 away from the crossbars 16 and the path of the rail 12 (FIG. 5). Preferably, the length of the horizontal outward extending leg 50A of the lifter 50 is about 6 to 18 inches (15.24 to 45.72 cm). The base 50B of the lifter 50 is mounted onto the center portion 44A of the connectors 44 by the nut and bolt 46. The base 50B of the lifter 50 is mounted at different positions along the length of the connectors 44 depending on the weight of debris to be lifted (FIG. 11). The number of nuts and bolts 46 needed to mount the lifter 50 to each of the connectors 44 depends upon the length of the base 50B of the lifter 50 and the length of the connectors 44. The connectors 44 and the lifter 50 may also be constructed as a unitary piece. The end of the base 50B opposite the outward extending leg 50A is angled in order to follow the angled ends of the connectors 44 where the base 50B extends beyond the center portion 44A of the connector 44. The angled end of the base 50B assists in securely mounting and correctly positioning the lifter 50 on the connectors 44. The length of the base 50B of the lifter 50 varies depending on the amount and the weight of the debris the lifter 50 needs to move upward with the belt 36. Preferably, the length of the base 50B of the lifter 50 is equal to the length of one chain link 38 of the belt 36, pivot pin 40 to pivot pin 40 (FIG. 9). The length of the base 50B of the lifter 50 is varied instead of or along with varying the length of the connectors 44. Preferably, the length of the base 50B of the lifter 50 is a multiple of the length of a chain link 38 of the belt 36, center of pivot pin 40 to center of pivot pin 40 as the connectors 44 will only pivot at the pivot pins 40 (FIGS. 9A and 10A). In an alternate embodiment, the base 52A of an extended lifter 52 is equal to the length of two chain links 38 of the belt 36, center of pivot pin 40 to center of pivot pin 40 (FIG. 10). The lifters 50 and 52 are preferably constructed of the same material as the belt 36.

A motor 54 is connected to the upper sprocket shaft 30 of the upper sprocket cylinder 26. The motor 54 rotates the upper sprocket cylinder 26 which moves the belt 36 around the rail 12 (FIG. 4). Preferably, the motor 54 rotates the upper sprocket cylinder 26 in a counterclockwise direction which moves the front side 36A of the belt 36 upward from the bottom 12A to the top 12B of the rail 12. Preferably, the motor 54 is a hydraulic motor. Alternately, the motor 54 is an electric motor.

A barrier plate 56 is mounted on the rail 12 and extends between the vertical side bars 14 from the top 12B of the rail 12 to just above the water system 100 (FIG. 5). The barrier plate 56 prevents the debris from falling through the openings 42 of the belt 36 once the belt 36 has moved upward out of the water system 100. Preferably, the barrier plate 56 is made of the same material as the rail 12.

A flange 58 is mounted adjacent the bottom 12A of the rail 12 and extends between the lower sprocket cylinder 32 and the bottom 12A of the rail 12 which is resting adjacent the floor 100A of the water system 100 (FIG. 1). The flange 58 extends completely across the rail 12 and prevents debris from escaping beneath the apparatus 10. Only the bottom of the flange 58 is secured to the rail 12 such that the top of the flange 58 is able to be moved outward in order to allow the lifters 50 to move around the lower sprocket cylinder 32 (FIG. 7). The flange 58 also prevents large and heavy debris from getting underneath or past the rail 12 and possibly jamming the apparatus 10 or entering the water intake opening 102. Preferably, the flange 58 is constructed of a flexible material such as a reinforced rubber.

A water pressure jet 60 is mounted adjacent the top 12B of the rail 12 beneath the belt 36 on the rail 12 (FIG. 5). The water pressure jet 60 sprays a stream of high pressure water through the openings 42 of the belt 36 to assist in the removal of debris or deposits in the openings 42 of the belt 36 which was loosened by the upper sprocket teeth 28A of the upper sprocket cylinder 26. The water pressure jet 60 is mounted such that the water jet 60 sprays water through the belt 36 after the belt 36 has moved over the upper sprocket cylinder 26.

IN USE

In use, the apparatus 10 is mounted in the water system 100 adjacent to and upstream from the water supply intake opening 102. The apparatus 10 is mounted such that the bottom 12A of the rail 12 is adjacent the floor 100A of the water system 100 and the top 12B of the rail 12 extends upward beyond the top platform 102A. Once the apparatus 10 is in place, the upper sprocket cylinder 26 of the apparatus 10 is connected to the motor 54 and the apparatus 10 is ready to be activated.

To activate the apparatus 10, the motor 54 is turned "on" which rotates the upper sprocket cylinder 26 and moves the front side 36A of the belt 36 upward. Preferably, if several apparatus 10 are used, each apparatus 10 has a separate motor 54 and the motors 54 are operated in cycles such that the lifters 50 of each belt 36 of each apparatus 10 are not aligned. Alternately, the motors 54 for each apparatus 10 are activated at different intervals such that only one apparatus 10 is moving at one time. While the belt 36 is in the water system 100, the water system 100 flows through the openings 42 of the belt 36. The entire belt 36 has openings 42 which allows the apparatus 10 to continually filter the debris from the water system 100. As the water system 100 flows through the openings 42, debris in the water system 100 is caught by the chain links 38 of the belt 36 and mats against the front side 36A of the belt 36 of the apparatus 10. Preferably, the belt 36 moves at a rate of about 6 to 10 feet (182.88 to 304.80 cm) per minute. This slow rate of speed allows the debris to mat against the front side 36A of the belt 36 prior to the arrival of the lifter 50 which moves the collected debris upward. The upward movement of the belt enables the lifter 50 to carry the trapped debris toward the top 12B of the rail 12 of the apparatus 10. The barrier plate 56 on the rail 12 prevents the collected debris from falling through the openings 42 of the belt 36 and back into the water system 100 downstream from the apparatus 10. If the collected debris is too heavy to be lifted by the lifter 50 of the apparatus 10, the lifter 50 will tilt to deposit the debris back into the water system 100 upstream from the apparatus 10. The lifter 50 tilts in response to excessive weight on the outward extending leg 50A of the lifter 50. The lifter 50 is able to tilt due to the slack in the belt 36 which allows the lifter 50 to pivot at one end of the connectors 44 away from the path of the rail 12. The lifter 50 tilts by pivoting the connectors 44 about the bottom pivot pin 40 which allows the lifter 50 to obtain an almost vertical position instead of the standard horizontal position (FIGS. 9 and 9A). The exact weight at which the lifter 50 tilts depends on the size of the lifter 50 and the connectors 44, the positioning of the lifter 50 on the connectors 44 and the amount of slack in the belt 36. The tiltability of the lifter 50 prevents possible damage to the apparatus 10 due to the collection of debris of excess weight.

As the belt 36 moves over the upper sprocket cylinder 26, the upper sprocket teeth 28A of the upper sprocket cylinder 26 extend into and through the openings 42 of the belt 36. The upper sprocket teeth 28A are of a size such that the upper sprocket teeth 28A completely fill the openings 42 of the belt 36 and are very closely adjacent the sides of the openings 42. Thus, the upper sprocket teeth 28A of the upper sprocket cylinder 26 loosen the debris collected by the belt 36. The loosened debris falls into a collection trough 104 located beneath the top 12B of the rail 12 due to gravity. The upper sprocket teeth 28A also scrape the sides of the openings 42 such as to remove any animal life such as barnacles or zebra mussels or any other deposits which have collected in the openings 42. Once the openings 42 have passed over the upper sprocket cylinder 26, the water jet 60 washes the remaining debris and deposits from the openings 42 and the belt 36 into the trough 104. As the connectors 44 go over and around the upper sprocket cylinder 26, the lifter 50 is turned upside down which causes all collected debris on the lifter 50 to fall into the trough 104. Once the trough 104 is full, the debris is either taken to a dump site or is deposited back into the water system 100 downstream from the water intake opening 102. In the preferred embodiment, there is only one continuous trough 104 for every apparatus 10 used for a single water supply intake opening 102 or power plant. Preferably, the trough 104 has a water sluice (not shown) which moves debris along the trough 104 to a final collection bin (not shown). Alternately, the trough 104 has a conveyor belt (not shown) along the bottom of the trough 104 which continuously moves the debris along the trough 104 to the final collection bin. Preferably, the apparatus 10 runs only when the water flow through the apparatus 10 is restricted. A pressure differential switch (not shown) is used to activate the apparatus 10 when the water level between the intake opening 102 and the apparatus 10 is lower than the level of the water system 100 upstream from the apparatus 10 which indicates that the apparatus 10 is blocked with debris which is preventing water flow. The belt 36 is run at least once a day for about thirty (30) minutes or several revolutions of the belt 36 in order to remove the barnacles, zebra mussels and other deposits built up in the openings 42 of the belt 36. Alternatively, the apparatus 10 is activated manually when needed.

It is intended that the foregoing description be only illustrative of the present invention and that the present invention be limited only by the hereinafter appended claims.

I claim:

1. A method for removing debris from a free flowing water system, which comprises the steps of:

(a) providing an apparatus in the water system to remove the debris, the apparatus which comprises: a rail means having vertically oriented members defining an inclined path between the members, the rail means having a top and a bottom with the bottom extendable downward into the water system; a continuous belt means having a plurality of chain links horizontally and vertically connected together in a plane of the belt means to form the belt means and having a plurality of openings extending horizontally across the belt means, wherein the belt means extends between and around the top and the bottom of the rail means and is moveable upward along the path; a first sprocket cylinder means mounted at the top of the rail means having a first longitudinal axis and with a plurality of first sprocket teeth which extend into the openings of the belt means across the belt means during movement of the belt means around the top of the rail means to clean the openings of the belt means; a second sprocket cylinder means mounted at the bottom of the rail means having a second longitudinal axis parallel to the first longitudinal axis and with a plurality of second sprocket teeth which engage the links of the belt means to move the belt means around the bottom of the rail means; a plurality of debris engaging means tiltably mounted on the belt means, wherein the debris engaging means extend horizontally across the belt means and tilt by moving the chain links of the belt means away from the path in response to debris of excessive weight which dumps the debris back into the water system wherein when one debris engaging means tilts, the debris engaging means horizontally aligned across the belt means with the one debris engaging means also tilt; and motor means mounted adjacent the top of the rail means and connected to the first sprocket cylinder means for moving the belt means around the rail means wherein there is a collection means adjacent the top of the rail means of the apparatus to collect the debris removed from the water system; and (b) activating the motor means of the apparatus to move the sprocket cylinder means and thus the belt means to remove debris from the water system and into the collection means, wherein the first sprocket teeth prevent accumulation of clogging deposits in the openings of the belt means.

2. The method of claim 1 wherein the motor means of the apparatus is activated in response to a reduction in flow of the water system through the belt means.

3. The method of claim 1 wherein there are at least two apparatuses and wherein the motor means of the apparatuses are activated in cycles such that the debris engaging means are not aligned.

4. The method of claim 1 wherein there are at least two apparatuses and wherein the motor means of each of the apparatuses are activated at different intervals such that only one apparatus is moving at one time.

5. The method of claim 1 wherein the belt means moves at a rate of about 6.0 to 10.0 feet per minute.

6. The method of claim 1 wherein a pressure jet means is mounted at the top of the rail means adjacent to the belt means and wherein the pressure jet means clean the openings of the belt means after the openings have moved past the first sprocket cylinder means.

7. The method of claim 1 wherein the collection means has a water sluice which moves the debris to a final collection bin after the debris is collected in the collection means.

8. The method of claim 1 wherein the apparatus is provided in the water system adjacent a water supply intake opening.

9. The method of claim 8 wherein the apparatus has a pressure differential switch and wherein the motor means of the apparatus is activated when a level of the water on a side of the apparatus adjacent the intake opening is lower than a level of the water upstream from the apparatus.

10. The method of claim 1 wherein the motor means of the apparatus is activated at least once a day for about thirty (30)

minutes to remove any barnacles, zebra mussels or other deposits built up in the openings of the belt means.

11. The method of claim 1 wherein the motor means of the apparatus is activated manually when needed.

12. The method of claim 1 wherein the first sprocket teeth of the first sprocket cylinder means are slightly smaller than the openings of the belt means and wherein as the belt means moves, the first sprocket teeth extend into the openings of the belt means to clean deposits from the openings and through the openings to push the debris outward to loosen the debris removed by the apparatus.

13. The method of claim 1 wherein the motor means moves the belt means in a counterclockwise direction which moves a front side of the belt means upward from the bottom of the rail means to the top of the rail means.

14. A method for removing debris from a free flowing water system, which comprises:

(a) providing an apparatus in the water system to remove the debris, the apparatus which comprises: a rail means having spaced apart vertically oriented first members defining an inclined path between the first members and second members, the rail means having a top and a bottom with the bottom extendable downward into the water system; a continuous belt means having a plurality of chain links horizontally and vertically interconnected to form the belt means and having a plurality of openings extending horizontally across the belt means, wherein the belt means extends between and around the top and the bottom of the rail means and is moveable upward along the path; a first sprocket cylinder means mounted at the top of the rail means having a first longitudinal axis and with a plurality of sprocket teeth which extend into the openings of the belt means across the belt means during movement of the belt means around the top of the rail means to clean the openings of the belt means; a second sprocket cylinder means mounted at the bottom of the rail means having a second longitudinal axis parallel to the first longitudinal axis and with a plurality of Y-shaped sprocket teeth which engage the links of the belt means to move the belt means around the bottom of the rail means; a plurality of rake means tiltably mounted on the belt means wherein the rake means tilt by moving the chain links away from the path in response to debris of excessive weight which dumps the debris back into the water system; motor means mounted adjacent the top of the rail means and connected to the first sprocket cylinder means for moving the belt means around the rail means on the first sprocket cylinder means; pressure jet means mounted at the top of the rail means adjacent the belt means for cleaning the openings of the belt means after the openings of the belt means have moved past the first sprocket cylinder means; a barrier plate mounted on the rail means beneath the belt means where the belt means travels upwards above an upper level of the water system for preventing debris from falling through the openings in the belt means and into the water system; and a flange means mounted adjacent the bottom of the rail means in the water system for preventing debris from passing under the apparatus wherein there is a collection means adjacent the top of the rail means of the apparatus to collect the debris removed from the water system; and (b) activating the motor means of the apparatus to move the sprocket cylinder means and thus the belt means to remove debris from the water system and into the collection means, wherein the first sprocket teeth prevent accumulation of clogging deposits in the openings of the belt means.

* * * * *